United States Patent [19]

Jacobs, III et al.

[11] Patent Number: 4,484,994
[45] Date of Patent: Nov. 27, 1984

[54] HYDROXYALKYL CARBAMATE-CONTAINING RESINS FOR CATHODIC ELECTRODEPOSITION AND METHOD OF MAKING THE SAME

[75] Inventors: William Jacobs, III, Bridgeport; Girish G. Parekh, Fairfield; Werner J. Blank, Wilton, all of Conn.

[73] Assignee: American Cyanamid Company, Stamford, Conn.

[21] Appl. No.: 581,005
[22] Filed: Feb. 17, 1984
[51] Int. Cl.³ .................. C08L 63/00; C08G 18/58
[52] U.S. Cl. .................. 204/181 C; 523/414; 523/415; 525/504; 528/45; 528/73
[58] Field of Search .................. 528/45, 73; 523/415, 523/414; 525/504; 204/181 C

[56] References Cited
U.S. PATENT DOCUMENTS 3,922,253 11/1975 Jerabek et al. .................. 528/45
3,984,299 10/1976 Jerabek .................. 523/415 X
4,017,438 4/1977 Jerabek et al. .................. 523/420
4,031,050 6/1977 Jerabek .................. 528/45 X
4,101,486 7/1978 Bosso et al. .................. 528/45 X
4,260,716 4/1981 Christenson et al. .................. 528/45

Primary Examiner—Earl A. Nielsen
Attorney, Agent, or Firm—Steven J. Hultquist

[57] ABSTRACT

A cathodically electrodepositable, self-cross-linkable polymer is a hydroxyalkyl carbamate-containing resin having at least one tertiary amine and at least two hydroxyalkyl carbamate groups per molecule. The polymer is made by reacting an epoxy resin having an average epoxy equivalent weight of from about 300 to about 10,000 with one or more amines having at least one secondary amine group and at least one hydroxyalkyl carbamate group or precursor thereof. Hydrophobic amines may be co-reacted to enhance hydrophobicity of the polymer. An electrodeposition bath is made by acidifying the polymer to form an aqueous dispersion. A low temperature-curable coating is attained by utilization of the polymer with a suitable quaternary or ternary compound catalyst.

35 Claims, No Drawings

HYDROXYALKYL CARBAMATE-CONTAINING RESINS FOR CATHODIC ELECTRODEPOSITION AND METHOD OF MAKING THE SAME

BACKGROUND OF THE INVENTION

The present invention concerns hydrophobic, self-cross-linkable resins for use in cathodic electrodeposition of films on conductive substrates, to electrodeposition baths containing the same, and to a method of preparing such resins. The present invention also concerns a method for making low temperature curable cross-linked coatings from the material of the invention.

Electrodepositable resin compositions are of course well known in the art. For example, U.S. Pat. No. 4,031,050 discloses cationic electrodepositable compositions of blocked organic polyisocyanates and an amine adduct of an epoxy resin. As disclosed in this patent, electrodeposition of such compounds, which may optionally contain a catalyst for urethane formation, can be carried out to provide coatings on a conductive substrate, which coatings have desirable properties. In this regard, see also U.S. Pat. Nos. 3,984,299 and 4,031,050. However, isocyanate compounds are toxic and highly reactive, requiring the taking of suitable precautions in handling and storing the same.

U.S. Pat. No. 4,017,438 discloses an epoxy resin-derived, cationic electrodepositable resin enhanced by the incorporation of primary amine groups into the resin molecule, by reacting certain polyamine compounds having primary amine groups blocked by ketimine. The ketimine groups when contacted with water, will decompose to provide primary amine functionality as disclosed in this patent. Capped isocyanates are disclosed in combination with the amine-resin adduct to provide, together with a suitable catalyst a cationically electrodepositable resin system. The electrodeposited coating, upon being heated to an elevated temperature, usually in the presence of a cross-linking catalyst, undergoes cross-linking through urethane, hydroxy and amino groups.

As well known, the "capped" or "blocked" isocyanates react with hydroxyl groups and amino groups under conditions of elevated temperature to form urethane and urea cross-linkages.

Numerous literature references exist showing the reactions of primary and secondary amines with, for example, propylene carbonate to yield corresponding hydroxypropyl carbamates (*Compt. rend.* 1142, 1954). The literature also shows that bishydroxyalkyl carbamates derived from corresponding diamines have been further self-condensed, or transesterified with other diols, to produce linear thermoplastic polyurethanes. For example, see the article "The Preparation of Polymeric and Cyclic Urethans and Ureas from Ethylene Carbonate and Amines" by Elizabeth Dyer and Harvey Scott, *J.A.C.S.* (1956) pp. 672–675. See also the report ∓Polyurethane elastomers obtained without the use of diisocyanates" by L. Ya. Rappoport, G. N. Petrov, I. I. Trostyanskaya and O. P. Gavrilova in *International Polymer Science and Technology,* 8, No. 1, 1981 and an article by Richard D. Cowell entitled: "Thermoplastic Polyurethane Elastomers: Chemistry Properties and Processing for the 80's" in the *Journal of Elastomers and Plastics,* Vol. 14, (October, 1982) pages 195–203.

SUMMARY OF THE INVENTION

It has now been found that an electrodepositable polymer can be prepared in which hydroxyalkyl carbamate groups are incorporated therein by reaction of amines and polyamines with cyclic carbonates to provide a hydroxyalkyl carbamate group-containing secondary amine, which is then reacted with a suitable epoxy resin or the like.

In accordance with one aspect of the invention, there is provided a cathodically electrodepositable, self-cross-linkable polymer containing hydroxyalkyl carbamate groups and one or more tertiary amine groups per molecule. The polymer of the invention may be obtained as the reaction product of (a) an epoxy resin having an average epoxy equivalent weight of from about 300 to about 10,000, preferably from about 1,000 to about 4,000, and (b) one or more amines having at least one secondary amine group and at least one hydroxyalkyl carbamate or precursor thereof.

Preferred aspects of the invention may include one or more of the following features, alone or in combination: the epoxy resin may be selected from the group consisting of: (i) the reaction product of epichlorohydrin and a polyhydric phenol, (ii) the epoxy resin of (i) modified by reaction with carboxylate containing polybutadiene polymers, and (iii) the reaction product of epichlorohydrin and a condensation product of phenol with acetone and formaldehyde; the polymer may contain from about 0.6 to about 3.5, preferably from about 0.6 to about 2.9, more preferably from about 1.1 to about 2.5 milliequivalents ("meq") hydroxyalkyl carbamate per gram of resin solids.

In another aspect of the invention there is provided a method of preparing a cathodically electrodepositable polymer, which method comprises reacting (a) an epoxide having an average epoxy equivalent weight of from about 300 to about 10,000, preferably from about 1,000 to about 4,000, with (b) an amine containing at least one secondary amine group and at least one group selected from the class consisting of hydrolyzable blocked primary amine groups and hydroxyalkyl carbamate groups, to form a substantially epoxy-free material and, when said blocked primary amine groups are present, hydrolyzing the same to unblock said primary amine groups and then reacting a cyclic carbonate with said primary amine groups to form said hydroxyalkyl carbamate groups; the reactants (a) and (b) being selected to form said polymer with from about 0.6 to about 3.5, preferably from about 0.6 to about 2.9, more preferably from about 1.1 to about 2.5, meq hydroxyalkyl carbamate per gram of resin solids.

In another aspect, the method further includes reacting one or more hydrophobic amines with the epoxy resin to enhance hydrophobicity of the polymer.

One aspect of the invention provides an electrodeposition bath comprising an aqueous dispersion of acidified polymer as described above. The electrodeposition bath may further include a cross-linking catalyst, and a cross-linked coating may be prepared by heating the deposited coating at a temperature and for a time sufficient to cure it.

Another aspect of the invention provides an electrodepositable composition including, e.g., a ternary or quaternary compound cross-linking catalyst, a coating of which is curable at relatively low temperatures, e.g., from about 200° to about 250° F. about 93° to about 121°

C.), and within about one hour, e.g., about 20 to about 30 minutes.

Other aspects of the invention include utilizing epoxides and amines of the general and specific formulas indicated below to form the polymer of the invention. As used herein and in the claims, "epoxy equivalent weight" has its usual meaning of the molecular weight of the epoxide divided by the number of epoxy groups on the molecule, i.e., for a monoepoxide, the equivalent weight equals the molecular weight.

DETAILED DESCRIPTION OF THE PREFERRED EMBODIMENTS

Cyclic carbonates such as ethylene or propylene carbonate react with amines to form hydroxyalkyl carbamates, according to the following typical example, in which $R_a$ is assumed to be hydrogen:

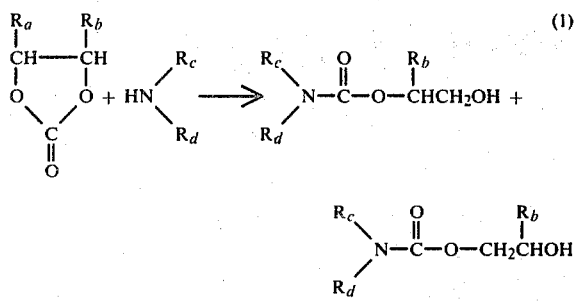
(1)

where $R_b$ is hydrogen for ethylene carbonate and methyl for propylene carbonate. The reaction may be run with or without solvent and, if so desired, protic solvents such as water or alcohols may be used. When either $R_c$ or $R_d$ is hydrogen, as in an unhindered primary amine, the reaction takes place at room or slightly elevated temperatures whereas secondary or hindered primary amines usually require heating and/or the use of catalysts for significant reaction. This difference in reactivity allows for the preparation of a wide variety of hydroxyalkyl carbamates containing any number of hindered primary or secondary amine groups. For example, the polyamine below will only react at primary amine sites at room or slightly elevated temperatures even with excess cyclic carbonate.

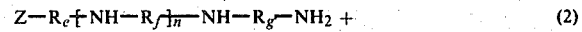
(2)

(cyclic carbonate of (1), $R_a = H$) ⟶

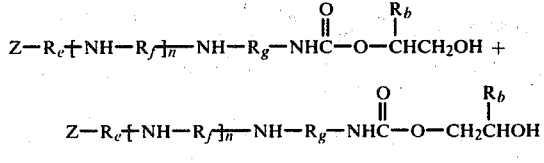

Hydroxyalkyl carbamate amines as illustrated in equations (1) and (2) above are useful in this invention, if, after reaction with suitable epoxy resins and upon acidification, they are cationic and sufficiently hydrophobic to be electrodeposited by conventional techniques. As described in some detail below, in some cases, in order to attain the requisite degree of hydrophobicity of the polymer, some of the available epoxy sites may be used to react with hydrophobic amines to incorporate the latter into the polymer. Useful di- or polyamines for the formation of hydroxyalkyl carbamate amines as illustrated above include those where, in equation (1), each R is independently H or straight chain or branched hydrocarbons from 1 to 50 carbon atoms or such containing either linkages. In equation (2), useful amines include those where n is from zero to about 5, $R_e$, $R_f$ and $R_g$ are straight chained or branched hydrocarbon fragments having one to about six carbon atoms, and where $R_e$, $R_f$ and $R_g$ may also contain an ether group. The Z group may be selected from: hydrogen, hydroxyl, or an alkoxy of from 1 to 20 carbon atoms or a secondary amine of from 1 to 20 carbon atoms, or a primary —$NH_2$ group. In the latter case, the primary amine group Z may be converted to a hydroxyalkyl carbamate group if enough (or excess) cyclic carbonate is utilized to form the hydroxyalkyl carbamate amine (or polyamine) compound.

The resulting hydroxyalkyl carbamate-containing amine is reacted with a water-insoluble, epoxide-containing "backbone" compound, which reaction may be generally represented as

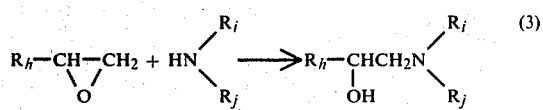
(3)

where $R_h$ is a fragment of an epoxy-containing resin and $R_i$ and $R_j$ are fragments of the above-described hydroxyalkyl carbamate-containing amine or polyamine compounds. The reaction usually occurs at room or slightly elevated temperatures and is often exothermic. The reaction may be performed without a solvent, otherwise aprotic or alcohol solvents may be used. Numerous types of mono or polyfunctional epoxides may be used, such as acyclic aliphatic, cyclic aliphatic, aromatic, heterocyclic, or oxygen or tertiary amine group-containing epoxides. For example, a typical polymer in accordance with the invention may have the formula:

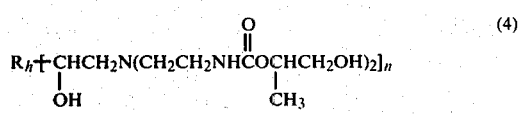
(4)

The resultant polymer, upon heating and, optionally, in the presence of a suitable cross-linking catalyst, will cross-link through one or more mechanisms, as follows: by cross-linking through backbone hydroxyl groups

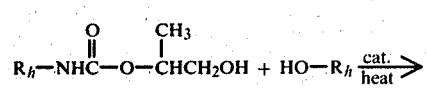
(5)

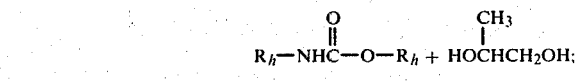

by cross-linking through self-condensation

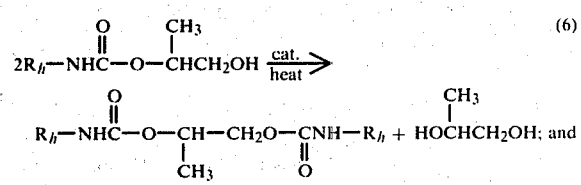
(6)

by cross-linking through backbone amine groups

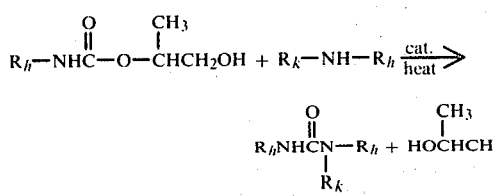 (7)

wherein $R_k$ is hydrogen or a fragment of the backbone polymer. It should be noted that in all of the cross-linking reactions (5), (6) and (7), the water sensitive hydroxyalkyl portion of the carbamate group is lost as a glycol. The cross-linked films therefore not only develop mechanical properties and solvent resistance during cure but also are water resistant.

Generally, the multi-functional amines utilized in the invention contain at least one secondary amine group which is hindered with respect to reacting with the cyclic carbonate and at least one primary amine group. As used herein and in the claims, (a) ("multi-functional amine" means an amine containing at least one primary amine group (which may be a blocked primary amine group as described below) and at least one hindered secondary amine group; and (b) "hindered secondary amine group" means a secondary amine group which is inhibited, sterically, electronically or otherwise, with respect to reacting with the cyclic carbonate under conditions at which the primary amine group will react. The secondary amine groups which are sterically or otherwise inhibited from reacting with a cyclic carbonate thus survive formation of the carbamate and are reactive with the epoxy groups on the polymer.

The above definition of "multi-functional amine" is intended to include blocked primary amine groups, such as ketimine groups, which can be unblocked to form the primary amine groups. As described in more detail below, the multi-functional amine can optionally be reacted with the epoxide prior to formation of the hydroxyalkyl carbamate groups by having the primary amine groups in the form of blocked primary amines, e.g., ketimine groups. After reaction with the epoxide, the ketimine groups may be hydrolyzed to primary amine groups and then reacted with the cyclic carbonate. Accordingly, any such blocked primary amine group is referred to herein, and in the claims, as a "precursor" of a hydroxyalkyl carbamate group.

The cyclic carbonates which are to be reacted with the amines may comprise any suitable cyclic carbonate, including bis-carbonates, which are reactive with one or more of the primary amine groups of a multi-functional amine. Generally, five-member ring organic carbonates are preferred as compared to six-member ring organic carbonates because the latter are relatively more expensive and difficult to prepare. Accordingly, a preferred cyclic carbonate utilizable in the present invention has the formula shown in equation (1) above, wherein $R_a$ and $R_b$ may be the same or different, and each may comprise H, or a $C_1$ to $C_8$ aliphatic, cycloaliphatic, aromatic or heterocyclic compound. Ethylene carbonate and propylene carbonate are readily available and have been successfully employed and to this extent are preferred reactants.

As indicated above, the amines utilized in accordance with the present invention to react with one or more cyclic carbonates to provide hydroxyalkyl carbamate-containing amine groups may be any one of a large number of compounds and, generally, may comprise multi-functional amines containing straight chain or branched alkyl, cycloalkyl or alkyl aromatic moieties, most preferably $C_1$ to $C_{20}$ alkyl, cycloalkyl or alkyl aromatic moieties and such moieties containing, in addition to at least one carbon atom, one or more heteroatoms. Such moieties containing one or more heteroatoms include, for example, those containing ether groups, thio groups and organo-silicon moieties. General representation of preferred classes of amines are given by the following formulas:

 (a)

where each x is independently 2 to 6 and n is 0 to 4;

 (b)

where $R_3$ is a $C_1$ to $C_{20}$ alkyl, cycloalkyl or alkyl aromatic moiety, and y is 2 or 3; and

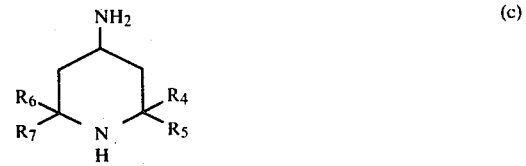 (c)

where each of $R_4$ and $R_6$ is independently H or a $C_1$ to $C_4$ moiety and each of $R_5$ and $R_7$ is independently a $C_1$ to $C_4$ alkyl moiety.

Suitable amines include the following fatty acid diamines of the general formula $RNHCH_2CH_2CH_2NH_2$ wherein R is a $C_1$ to $C_{20}$ organic moiety, e.g., hydrogenated tallow diamine, tall oil diamine, coco diamine, oleyl diamine and the like; ether diamines of the general formula $R'OCH_2CH_2CH_2NHCH_2CH_2CH_2NH_2$, wherein R' is a $C_1$ to $C_{15}$ organic moiety; and silyl amines of the general formula $(C_2H_5O)_3SiCH_2CH_2CH_2NHCH_2CH_2CH_2NH_2.$ Reaction of a cyclic carbonate with the primary amine groups of one or more amines as indicated above will provide amines containing at least one hydroxyalkyl carbamate group in addition to unreacted secondary amines. Thus, amines-pendant hydroxyalkyl carbamate resins are obtained having structures in which the $-NH_2$ groups of the above formulas are converted to

wherein each $R_1$ and $R_2$ is independently H, or a $C_1$ to $C_{20}$ alkyl, cycloalkyl or alkyl aromatic moiety.

For example, a hydroxyalkyl carbamate group-containing amine found to be useful in preparing electrodepositable polymers in accordance with the invention is obtained by reacting N,N-bis(6-aminohexyl)-2-[(6-aminohexyl)amino] butanediamide with propylene carbonate, and has the formula:

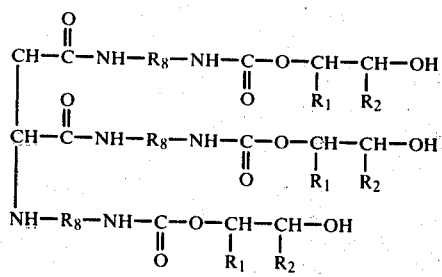

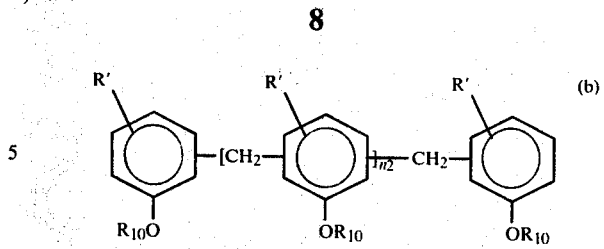

where $R'$ is a hydrogen or a methyl group and $R_{10}$ is a hydrogen atom or a glycidyl group and $n_2$ is from 0 to 12;

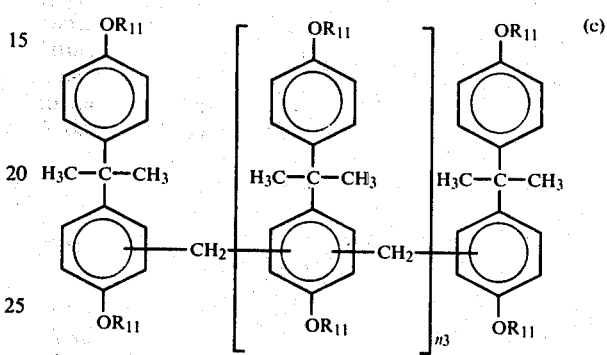

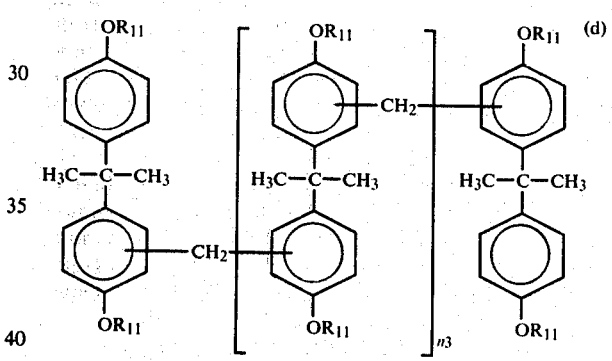

wherein each of $R_1$ and $R_2$ is as defined above and each $R_8$ is $C_6$ alkylene. Other useful amines of this type may be prepared wherein $R_8$ is independently a $C_2$ to $C_6$ alkylene moiety.

Preferred multi-functional amines for reacting with the cyclic carbonate include, for example, diethylenetriamine and triethylenetetramine.

It will be appreciated that those skilled in the art will, when utilizing polyamines, select conditions and reactants so as to avoid gellation in forming the polymer.

The epoxide material utilized in accordance with the invention may be a monomeric or polymeric epoxy containing material, preferably a resinous polyepoxide material containing two or more epoxy groups per molecule.

Among the known epoxides which have been found useful in the practice of the present invention are polyglycidyl ethers of polyphenols such as bisphenol-A or, generally, the reaction product of epichlorohydrin with a polyhydric phenol. As used herein, "polyhydric phenol" means and includes compounds such as bisphenol-A, bisphenol-F and bisphenol-S. Such epoxides may also be modified by reaction with carboxylate containing polybutadiene polymers or other modifying materials.

Polyepoxides made from polyhydric phenol resins such as novalac resins or the like comprise one suitable class of compounds. Polyglycidyl esters of polycarboxylic acids, such as the reaction products of epichlorohydrin or other similar epoxy compounds with reactants such as cyanuric acid, terephthalic acid, glutaric acid, succinic acid, oxalic acid and the like may also be employed.

Multi-functional amines as described above may be reacted with, for example, a polyepoxide of one of the following formulas:

wherein, in (c) and (d), $n_3$ is independently 0 to 4, and $R_{11}$ is a hydrogen atom or a glycidyl group. In the claims, epoxides of the formula (c) or formula (d), or mixtures thereof, are referred to as an "aromatic novalac bisphenol-A resin". The defined term thus includes epoxides selected from the formula (c), or the formula (d), or combinations thereof.

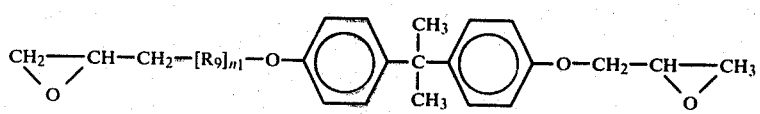

(a)

where $R_9$ is the repeating fragment

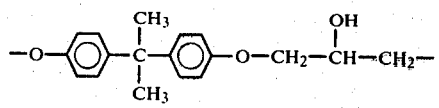

and $n_1$ is from 0 to 12;

A suitable polyepoxide as described above is reacted with approximately one equivalent of the above described amines containing one or more secondary amine groups. The equivalent ratio of amines to epoxy groups should be approximately one to one. Ideally, all reactive epoxy groups will react with a secondary amine group to attach the amine to the epoxy polymer. However, a slight excess or deficiency of epoxy groups after reaction with the secondary amines can be tolerated and accomodated by subsequently adding a small quantity of monoepoxides (in the case of excess secondary amine groups) or simple amines (in the case of excess epoxy groups). Each of the amine groups contains one or more hydroxyalkyl carbamate groups formed thereon by reaction of a cyclic carbonate with a primary amine group of the multi-functional amine, resulting in a self-cross-linkable polymer. Sufficient amine groups are attached to the polymer to render it electrodepositable by cationic deposition.

In an alternate method of manufacturing the depositable polymer of the invention, the epoxides are reacted with amines which contain, in addition to one or more secondary amine groups reactable with the epoxy groups, ketimine groups in lieu of the above described hydroxyalkyl carbamate groups. After reaction of the secondary amine groups with the epoxy groups as described above, so that the amine groups are pendant upon the backbone epoxy polymer, the polymer is acidified and water added thereto. This causes the ketimine groups to react to form free amine groups and one or more suitable cyclic carbonates may then be added to the mixture to react with the resultant free amine groups on the pendant amine moieties. Thus, the multi-functional amine utilized to form the hydroxyalkyl carbamate will contain either an amine group reactable with a cyclic carbonate or a ketimine group convertible to an amine group reactable with the cyclic carbonate. As used herein and in the claims, a "precursor" of a carbamate group means a ketimine group as described in this paragraph.

As will be appreciated by those skilled in the art, a certain degree of hydrophobicity is required of a cathodically electrodepositable polymer. In the case of epoxide polymers which are highly epoxy functional, such as novalac resins, it may be necessary or desirable to coreact the polymer with hydrophobic amines in addition to the amines containing hydroxyalkyl carbamate groups or precursors thereof, i.e., ketimine groups. A quantity of amines of selected hydrophobicity is selected to impart added hydrophobicity to the resultant hydroxyalkyl carbamate-containing electrodepositable resin as required to overcome the hydrophilicity of the hydroxyalkyl carbamate groups.

Preferably, the amount of hydrophobic amines utilized is just sufficient to impart the required degree of hydrophobicity to the carbamate polymer. This is because such hydrophobic amines occupy reactive epoxy sites at the expense of the hydroxyalkyl carbamate-containing amines, thereby limiting the number of cross-linking sites available. Insufficient cross-linking sites would of course result in the cured films obtained from such resins not having the desired properties obtainable by a sufficient degree of cross-linking.

Preferably, secondary hydrophobic amines are utilized to enhance hydrophobicity of the epoxy carbamate resins. Although primary amines and primary/secondary polyamines could be utilized, it will be appreciated by those skilled in the art that reaction of such amines with polyepoxy resins may result in gellation. Those skilled in the art will also appreciate that specific reactants and conditions may be selected to avoid such gellation. However, it is generally preferable to utilize amines of general structure

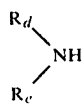

where each of $R_d$ and $R_e$ is independently an aliphatic $C_4$ to $C_{20}$ moiety, a cyclic aliphatic, heterocyclic or aromatic moiety or the like, provided that the resulting amine is hydrophobic.

A preferred class of secondary hydrophobic amines is one in which $R_d$ is an aromatic group, $R_e$ is an acyclic aliphatic alkyl, cyclic aliphatic, alkyl aromatic or alkyl heterocyclic group. Such preferred secondary amines include N-methylaniline, N-ethylaniline, N-propylaniline, N-butylaniline, N-benzylaniline, etc.

Preferably, the weight percent of the hydrophobic amine (expressed as the weight of the hydrophobic amine divided by the sum of the weight of the hydrophobic amine plus the carbamate polymer, all based on 100% resin solids) comprises 10 to 80%, preferably, 10 to 40% by weight. Most preferably, the carbamate polymer containing such hydrophobic secondary amines is obtained from a novalac epoxy resin. The utilization of hydrophobic amines to overcome hydrophilic tendencies of the resin is generally not encountered when high equivalent weight bisphenol-A resins or the like are utilized as the backbone resin, inasmuch as only the end segments of the bisphenol-A epoxy resins contain epoxy groups, and intermediate portions are repeated hydrophobic segments.

A catalyst may optionally be incorporated into the composition of the invention, either as an external catalyst or as an internal catalyst by incorporation within the backbone polymer during preparation, as known in the art. While any suitable cross-linking catalyst may be utilized (such as known tin, zinc, and titanium compounds) ternary or quaternary compounds as described below are preferred and are utilized in order to attain the low temperature curing benefits of the invention. However, for example, dibutyltindilaurate or other tin or zinc catalysts are also useful as a cross-linking catalyst for the polymers of the invention.

Generally, the ternary or quaternary catalysts are known compounds of the formula:

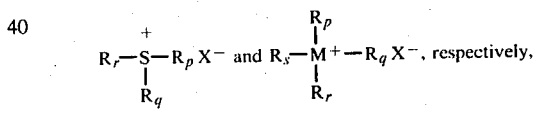

where $R_p$, $R_q$, $R_r$ and $R_s$ may be equivalent or different and may be $C_1$ to $C_{20}$ aliphatic, aromatic, benzylic, cyclic aliphatic and the like, where M may be nitrogen, phosphorus or arsenic (to provide, respectively, quaternary ammonium, phosphonium or arsonium compounds), where S is sulfur (to provide a ternary sulfonium compound) and where $X^-$ may be hydroxide, alkoxide, bicarbonate, carbonate, formate, acetate, lactate, and other carboxylates derived from volatile organic carboxylic acids or the like. Such salts of carboxylic acids are effective to promote the low temperature cure provided that the carboxylic acids are volatile. Preferably the catalysts are hydrophobic and co-deposit during electrodeposition.

In preparing electrodeposition baths in accordance with the invention, the polymer is dispersed in water by partial acidification with an acid such as formic acid and, when an external catalyst is utilized, a catalyst such as dibutyltindilaurate or a quaternary ammonium compound is added. Alternatively, the catalyst may be incorporated into the backbone polymer to provide an internal catalyst, as mentioned above. Any suitable acid may be employed to disperse the self-cross-linking resins of the invention, including hydrohalic acids, nitric, sulfuric, phosphoric, or other mineral acids and water soluble organic acids such as formic acid (preferred), acetic, lactic, propionic, butyric, pentanoic and citric acids and the like, as well as polycarboxylic acids such as oxalic, malonic, succinic, maleic, and fumaric acids, and the like.

The efficacy of the invention is demonstrated by the following examples of specific preferred embodiments thereof. Examples 1–3 illustrate the preparation of carbamate group-containing amines and a carbamate and ketimine group-containing amine.

EXAMPLE 1

Diethylenetriamine in the amount of 206 grams (2 moles) and 600 grams of solvent methanol were added to a suitable reactor. 612 grams (6 moles) of propylene carbonate, which amount comprises 2 moles in excess of the stoichiometric amount, were slowly added to the reactor under a nitrogen blanket while the temperature of the reactants was maintained at 15°–20° C. by ice bath cooling. After complete addition, the mixture was stirred 8 hours at room temperature. Methanol was then removed by use of water pump vacuum and with steam bath heating. The resulting product solution comprised diethylenetriamine bishydroxypropyl carbamate and was 73% solids in propylene carbonate (theory 75% solids), had 2.16 meq/g secondary amine (theory 2.37 meq/g at 73% solids), and gave characteristic bands in the infrared for the hydroxypropyl carbamate group.

EXAMPLE 2

Diethylenetriamine in the amount of 206 grams (2 moles) was added to a suitable reactor equipped with an inlet for a nitrogen atmosphere and with a decanting trap in the distillate return line. The reactor was cooled in an ice bath and propylene carbonate (306 grams, 3 moles) was slowly added with good stirring, while maintaining the temperature below 40° C. Upon complete addition, the reactor was heated and stirred at 80° C. for 2 hours after which time no unreacted propylene carbonate could be detected by infrared analysis. To the reactor was then added 300 grams (3 moles) of methylisobutyl ketone (MIBK) and the contents were brought to reflux. After refluxing approximately two hours, the theoretical amount of water was collected in the decanting trap and the reactor was cooled. The resulting product comprising a mixed carbamate/ketimine of diethylenetriamine was 73% solids in MIBK (theory 74.8% solids). Non-aqueous potentiometric titration for secondary amine disclosed 2.58 meq/g amine (theory for 73% solids is 2.46 meq/g) and the infrared showed the characteristic bands for hydroxypropyl carbamate and ketimine groups.

EXAMPLE 3

To a suitable reactor containing 408 grams (4 moles) of propylene carbonate and 300 grams of solvent methanol, 292 grams (2 moles) of triethylenetetramine were slowly added while maintaining the temperature at 15° to 30° C. by ice bath cooling. Upon complete addition, the mixture was heated to 80° C. for approximately 3 hours after which only a trace band in the infrared could be seen for propylene carbonate. Solvent methanol was then removed by distillation, the last traces of which were removed at 5 mm of pressure with steam bath heating. On standing at room temperature, the product, which comprises triethylenetetramine bishydroxypropyl carbamate, solidified to a low melting paste. The product was found to be 98% nonvolatile and titrated in water (phenol red indicator) as though only one amine group per molecule titrated, showing an equivalent weight of 367 (theoretical molecular weight corrected to 98% solids is 367). Potentiometric titration with $HClO_4$ in acetic acid yielded an equivalent weight of 210 which is closer to theory. The infrared spectrum was completely consistent with structure and no problems were subsequently encountered using a theoretical equivalent weight of 175.

The following examples illustrate the preparation of specific cathodic electrocoating compositions in accordance with the present invention.

EXAMPLE 4

A. A self-cross-linking cathodic electrocoating composition containing tertiary amine groups was prepared from the following ingredients:

|  | Parts by Weight | Equivalents |
| --- | --- | --- |
| Epon 1004* | 1017.0 | 1.0 |
| Methyl isobutyl ketone (MIBK) | 176.0 | — |
| Carbamate-containing Amine of Example 1 | 370.4 | 0.8 |
| Diethylamine | 15.0 | 0.2 |
| Propasol P** | 150.0 | — |

*A trademark of Shell Chemical Co. for its product comprising the reaction product of epichlorohydrin and bisphenol-A
**A trademark of Union Carbide Corp. for its propoxypropanol product.

B. The Epon 1004 and MIBK were charged under nitrogen to a suitable reactor as described in Example 2. (The same type reactor is used in Examples 5–9.) The mixture was heated to reflux with stirring in order to remove any water present. After cooling to 80° C. the carbamate-containing amine of Example 1 was added and the temperature was allowed to rise to 90° C. (mild heat of exotherm). Upon complete addition the mixture was heated and held at 100° C. for 2 hours. The diethylamine dissolved in the Propasol P was then added slowly so as not to lose diethylamine by volatilization. After addition, the mixture was heated further for 2 hours at 85° C. To remove residual free amine, 250 parts of Propasol P was added and then this same amount was removed by vacuum distillation at 110° to 125° C. The resultant product comprised 76% by weight resin solids and 0.79 meq amine per gram based on 100% resin solids.

C. An electrodeposition bath was prepared by combining 50 grams of the self-cross-linking cathodic electrocoating resin obtained in part B of this Example with 10 grams of hexyl Cellosolve (ethylene glycol monohexyl ether—a flowing agent), 1.2 grams of 89.9% formic acid, and 1.3 grams of dibutyltindilaurate (a urethane catalyst). 398 grams of deionized water was slowly added while rapidly mixing with a Cowels stirrer to produce a bath containing approximately 10% solids. The resultant electrodeposition bath had a pH of 4.6, a conductivity of 1800 micromho $cm^{-1}$, and a rupture voltage of 180 volts.

D. The bath composition obtained in part C of this Example was applied, by electrodeposition, to aluminum panels serving as the cathode at 75 V for 20 seconds to deposit a thin resin coating on the panels. The panels were then baked at 175° C. for 20 minutes and showed film builds of roughly 0.2–0.4 mils. All were slightly rough because of minor gassing during electrodeposition as a consequence of emulsion conductivity.

This problem could readily be overcome by refining the preparation technique to remove residual free amine. All panels exhibited 4H pencil hardness and resisted greater than 200 methyl ethyl ketone double rubs.

EXAMPLE 5

A. A self-cross-linking cathodic electrocoating composition containing tertiary amine groups and ketimine groups is prepared from the following ingredients:

|  | Parts by Weight | Equivalents |
| --- | --- | --- |
| EPON 1004F* | 780.0 | 1.00 |
| MIBK | 176.0 | — |
| carbamate-containing Amine of Example 2 | 302.0 | 0.78 |
| Propasol P** | 105.0 | — |
| EPON 1001F* | 96.8 | 0.20 |
| Diethylamine | 32.0 | 0.44 |

*A trademark of Shell Chemical Co. for its product comprising the reaction product of epichlorohydrin and bisphenol-A.
**A trademark of Union Carbide Corp. for its propoxypropanol product.

B. The EPON 1004F and MIBK were charged under nitrogen and water was removed as in Example 4. At 80° C. the carbamate-containing amine of Example 2 was added followed by the EPON 1001F and one-half of the Propasol P. The mixture was stirred and held at 80° C. for two hours and then the diethylamine dissolved in the remaining Propasol P was slowly added so as to prevent volatilization. The mixture was then stirred and heated at 85° C. for 8 hours. 150 grams of Propasol P was then added and removed by vacuum distillation (flask temperature 110° to 120° C.). This process was repeated with another 150 grams of Propasol P. The resultant product comprised 76% by weight resin solids and 0.91 meq amine per gram; based on 100% resin solids.

C. An electrodeposition bath was prepared by combining 50 grams of the self-cross-linking cathodic electrocoating resin obtained in part B of this Example with 5 grams of hexyl Cellosolve, 5 grams of benzyl hydroxypropyl carbamate (a reactive diluent-flow agent prepared by reacting one equivalent of benzyl amine with one equivalent of propylene carbonate and removing any residual amine with acidic ion-exchange resin); 10 grams of EPON 828 (Shell Chemical Co.), 1.54 grams of 89.9% formic acid, and 1.63 grams of dibutyltindilaurate. 376 grams of deionized water was then slowly added while rapidly mixing with a Cowels stirrer to produce a bath containing approximately 12% solids. The bath had a pH of 4.4, a conductivity of 1300 micromho cm$^{-1}$, and a rupture voltage of 270 volts.

D. The bath composition obtained in part C of this Example was applied, by electrodeposition, to aluminum panels serving as the cathode at 75 V for 20 seconds to deposit a thin resin coating on the panels. The panels were then baked at 175° C. for 20 minutes and afforded film builds of 0.4 mils. The coatings were smooth, flexible, had 4H pencil hardness, passed 40 in-lb impact tests, and resisted greater than 200 methyl ethyl ketone double rubs.

EXAMPLE 6

A. A self-cross-linking cathodic electrocoating composition containing tertiary amine, ketimine, and having on average, a larger proportion of carbamate cross-linking groups, was prepared from the following ingredients:

|  | Parts by Weight | Equivalents |
| --- | --- | --- |
| EPON 1004F* | 780.0 | 1.00 |
| MIBK* | 176.0 | — |
| Carbamate-containing Amine of Example 3 | 35.0 | 0.20 |
| Carbamate-containing Amine of Example 2 | 277.9 | 0.72 |
| Butyl Cellosolve** | 201.9 | — |
| Styrene Oxide | 20.9 | 0.17 |

*As in Example 4
**Mono butyl ether of ethylene glycol

B. As in Example 4, water was removed from the EPON 1004F after charging with MIBK under nitrogen. At 85° C. the carbamate-containing amine of Example 3 dissolved in one third of the butyl Cellosolve was added and the mixture was stirred for one hour. At this same temperature, the carbamate-containing amine of Example 2 was added and the mixture was further stirred for 8 hours. The styrene oxide was then dissolved in the remaining butyl Cellosolve and the whole was added at 90° C. and stirred an additional 4 hours. The resultant product comprised 69% by weight resin solids and 1.10 meq amine per gram based on 100% resin solids.

C. An electrodeposition bath was prepared by combining 50 grams of the self-cross-linking cathodic electrocoating resin obtained in part B of this Example with 3 grams of hexyl Cellosolve, 5 grams of benzyl hydroxypropyl carbamate, 7 grams of EPON 828, 1.26 grams of 89.9% formic acid, and 1.4 grams of dibutyltindilaurate (urethane catalyst). 475 grams of deionized water was then added slowly while rapidly mixing with a Cowels stirrer to produce a bath containing approximately 10% solids. The electrodeposition bath had a pH of 4.1, a conductivity of 1050 micromho cm$^{-1}$, and a rupture voltage of 400 volts.

D. The bath composition obtained in part C of this Example was electrodeposited on aluminum panels serving as the cathode at 100 V for 20 seconds to deposit a thin resin coating on the panels. After baking the coated panels at 175° C. for 20 minutes, the panels showed film builds of 0.3 mils. The coatings were glossy, smooth, flexible, had 4H pencil hardness, passed 40 in-lb impact tests, and resisted greater than 400 methyl ethyl ketone double rubs.

EXAMPLE 7

A. A self-cross-linking cathodic electrocoating composition containing tertiary amine, ketimine, and alkyl groups was prepared from the following ingredients:

|  | Parts by Weight | Equivalents |
| --- | --- | --- |
| EPON 834* | 729.0 | 3.00 |
| MIBK* | 176.0 | — |
| Dodecylamine | 166.5 | 1.80 |
| Carbamate-containing Amine of Example 3 | 35.0 | 0.20 |
| Carbamate-containing Amine of Example 2 | 337.5 | 0.87 |
| Butyl Cellosolve | 256.3 | — |
| Styrene Oxide | 24.1 | 0.20 |

*As in Example 4

B. Water was removed from the EPON 834 by charging with MIBK and refluxing under nitrogen as in Example 4. After cooling to 80° C. the dodecylamine dissolved in 50 parts of the butyl Cellosolve was slowly added and the temperature allowed to reach 115° C. (heat of exotherm). The carbamate-containing amine of Example 3 dissolved in 50 parts of the butyl Cellosolve was then added and the mixture was allowed to slowly cool and was stirred for one hour. After this time, and at 90° C., the carbamate-containing amine of Example 2 dissolved in 100 parts of butyl Cellosolve was added and the mixture was stirred and maintained at 90° C. for 5 hours. Following this, the styrene oxide dissolved within the remainder of the butyl Cellosolve was added and the mixture was stirred and heated at 90° C. for an additional 12 hours. The resultant product comprised 70% by weight resin solids and 1.89 meq amine per gram, based on 100% resin solids.

C. An electrodeposition bath was prepared by combining 50 grams of the self-cross-linking cathodic electrocoating resin obtained in part B of this Example with 5 grams of hexyl Cellosolve, 1.37 grams of 89.9% formic acid, and 1.2 grams of dibutyltindilaurate (urethane catalyst). 320 grams of deionized water was then added slowly while rapidly mixing with a Cowels stirrer to produce a bath containing approximately 10% solids. The electrodeposition bath had a pH of 4.6, a conductivity of 1050 micromho cm$^{-1}$, and a rupture voltage of 300 volts.

D. Electrodeposition of the composition obtained in part C of this Example on aluminum and bare (untreated) steel panels serving as the cathode at 100 V for 20 seconds deposited a thin film of resin and afforded, after curing at 175° C. for 20 minutes, film thicknesses of 0.4 mil on aluminum and 0.55 mil on bare steel. All coatings were glossy, smooth, flexible, had 4H pencil hardness, passed 40 in-lb impact tests on aluminum and 150 in-lb impact tests on steel, and resisted greater than 100 methyl ethyl ketone double rubs. After exposure to 200 hours in a salt spray cabinet, the coatings on bare steel showed 6 mm pull from the scribe and almost no rusting (rate 9 by ASTM 0610-68).

EXAMPLE 8

A. A one to one mixture of the self-cross-linking resin of Example 6 and of the self-cross-linking resin of Example 7 to form an electrocoating composition incorporating the advantages of both was prepared from the following ingredients:

|  | Parts by Weight |
| --- | --- |
| The Resin of Example 6 | 25.00 |
| The Resin of Example 7 | 25.00 |
| Hexyl Cellosolve | 5.00 |
| Formic Acid (89.9%) | 1.38 |
| Dibutyltindilaurate | 1.10 |
| Deionized Water | 315.00 |

B. The electrodeposition bath was prepared by first combining all of the above ingredients except the water. The water was then slowly added while rapidly mixing with a Cowels stirrer producing a bath containing approximately 10% solids. The electrodeposition bath had a pH of 4.3, a conductivity of 1100 micromho cm$^{-1}$, and a rupture voltage of 340 volts.

C. Electrodeposition of the bath composition of part B of this Example at 100 V for 20 seconds on aluminum, bare steel, and zinc phosphate-treated steel panels serving as the cathode deposited thin coatings which yielded film builds of 0.4 mil on aluminum, 0.55 mil on bare steel, and 0.5 mil on zinc phosphated steel after baking at 175° C. for 20 minutes. All coatings were glossy, smooth, flexible, and resisted greater than 400 methyl ethyl ketone double rubs. Coatings on aluminum panels had 4H pencil hardness and passed 40 in-lb impact tests, while coatings on steel substrates had 5H pencil hardness and passed 140 in-lb tests. After exposure to 100 hrs. in a salt spray cabinet, the coatings on bare steel showed 7 mm pull from the scribe and no rusting. After exposure to 1000 hours salt spray, the zinc phosphate steel panels showed 3 mm pull from the scribe and only trace rusting (rated 8 by ASTM 0610–68). The coatings on aluminum also passed the 30 day resistance test (Boeing Material Specification 5-89D) for the aerospace fluid Skydrol (BMS 3-11 Fluid) with only one unit drop in pencil hardness. After 60 days exposure to salt spray, the coated aluminum panels showed no change in appearance and no loss of adhesion at the scribe line.

EXAMPLE 9

A. A ketimine group-containing electrocoating backbone resin initially having no carbamate groups (and which is to be subsequently converted to a self-cross-linking cathodic electrocoating composition by reaction with an alkylene carbonate) was prepared from the following ingredients:

|  | Parts by Weight | Equivalents |
| --- | --- | --- |
| EPON 1004* | 458.0 | 0.50 |
| MIBK* | 95.0 | — |
| Diketimine | 108.0 | 0.40 |
| Diethylamine | 7.0 | 0.08 |
| Propasol P* | 100.0 | — |

*As in Example 4

B. As in Example 4, water was removed from the EPON 1004 by refluxing with MIBK under nitrogen. The mixture was then cooled to 80° C. and the diketimine (derived from one mole of diethylenetriamine and 2 moles of MIBK as described in U.S. Pat. No. 3,523,925) and 80 parts of the Propasol P were added. After about one half hour the diethylamine in the remainder of the Propasol P was added and the mixture was allowed to react at 80° C. for 1 hour and at 120° C. for 2 hours. The resultant product comprises 74.6% by weight resin solids and 2.24 meq amine per gram, based on 100% resin solids.

C. The resin obtained in part B of this Example was then converted into a self-cross-linking cathodic electrocoating composition as follows. To fifty grams of the resin was added 5 grams of hexyl Cellosolve, 1.2 grams of 89.9% formic acid, 1.2 grams of dibutyltindilaurate, and 6.86 grams of propylene carbonate. With rapid mixing using a Cowels stirrer, 403 grams of deionized water was slowly added, forming an electrocoating bath containing approximately 10% solids. The bath was allowed to stir and age for four days and showed no signs of instability. This bath had a pH of 6.6, a conductivity of 1900 micromho cm$^{-1}$, and a rupture voltage of 120 volts.

D. The composition obtained in part C of this Example was applied by electrodeposition to aluminum panels (as the cathode) at 75 V for 20 seconds to deposit a thin coating of resin. After curing at 175° C. for 20 minutes the panels showed film builds of roughly 0.2 to 0.4 mils. All coatings were rough due to gassing during electrodeposition. This problem could be overcome by refining the preparation technique to remove residual materials such as free residual low molecular weight amine which results in excessively high emulsion conductivity. All panels exhibited 4H pencil hardness and resisted greater than 100 methyl ethyl ketone double rubs.

A significant advantage of the compositions of the present invention is, as mentioned above, the provision of electrodepositable coatings which are curable at low temperatures, i.e., about 200° to 250° F. (about 93° to 121° C.). The following examples 10 and 11 are exemplary of finished coatings obtained with such low temperature cures.

EXAMPLE 10

A. A self-cross-linking cathodic electrocoating composition was prepared from the following ingredients:

|  | Parts by Weight | Equivalents |
|---|---|---|
| EPON 1001F* | 726.0 | 1.50 |
| MIBK* | 132.0 | — |
| Dodecylamine | 55.5 | 0.60 |
| Carbamate-containing Amine of Example 3 | 26.3 | 0.15 |
| Carbamate-containing Amine of Example 2 | 253.1 | 0.65 |
| Butyl Cellosolve** | 240.2 | — |
| Styrene Oxide | 20.4 | 0.17 |

*As in Example 4
**Mono butyl ether of ethylene glycol

B. The EPON 1001F and MIBK were charged under nitrogen into a suitable reactor and water was removed as in Example 4. At 85° C. the dodecylamine and the carbamate-containing amine of Example 3 were added in about 20 minutes time followed by 100 parts of the butyl Cellosolve. This mixture was stirred and heated at 85° C. for one hour and then the carbamate-containing amine of Example 2 was added with another 100 parts of butyl Cellosolve. After stirring and heating this mixture at 85° C. for 8 hours, the styrene oxide in the remainder of the butyl Cellosolve was added and the whole was heated and stirred at 95° C. for four additional hours. The final electrocoating resin was 69% solids and the meq/g total amine corrected to 100% solids was 1.32.

C. An electrodeposition bath suitable for a low temperature cure was prepared by combining 50 grams of the self-cross-linking cathodic electrocoating resin obtained in part B of this Example with 5 grams of hexyl Cellosolve, 1.52 grams of 89.9% formic acid, and 1.94 grams of 72% methyl tricaprylyl ammonium hydroxide catalyst (prepared from the chloride form by ion-exchange in methanol followed by reduced pressure evaporation of the methanol solvent). 314 grams of deionized water was then added while rapidly mixing with a Cowels Stirrer to produce a bath containing approximately 10% solids. The methyl tricaprylyl ammonium hydroxide catalyst is converted to the formate form in this composition. The resulting electrodeposition bath had a pH of 3.9, a conductivity of 1000 micromho $cm^{-1}$, and a rupture voltage of 220 volts.

D. The composition of part C of this Example was applied, by electrodeposition, to aluminum panels serving as the cathode at 75 V for 30 seconds to deposit a thin film of resin on the panels. The coated panels were baked at 250° F. (121° C.) for 20 minutes and showed film builds of 0.4 to 0.5 mil. All coatings were smooth, but slightly textured. The coatings were well cured, exhibited 4H pencil hardness, passing 40 in-lb impact tests, and were not removed after 200 rubs with methyl ethyl ketone (MEK).

EXAMPLE 11

A. The self-cross-linking cathodic electrocoating resin of part B of Example 10 was used for the following 250° F. (121° C.) curing electrocoating composition.

B. For the preparation of the electrocoating bath, Example 10 was repeated except that in place of the formic acid there was substituted 2.04 grams of 99.8% acetic acid. In this composition the catalyst is methyl tricaprylyl ammonium acetate arising from the replacement of the hydroxide counter ion with acetate ion. The electrodeposition bath had a pH of 4.2, a conductivity of 450 micromho $cm^{-1}$, and a rupture voltage of 280 volts.

C. Electrodeposition of a thin film of the resin of Part B of this Example was attained on aluminum panels serving as the cathode at 100 V for 30 seconds. The coated panels were baked at 250° F. (121° C.) for 20 minutes to afford film builds of 0.35-4.0 mils. The coatings were smooth, but slightly textured, had 4H pencil hardness, passed 40 in-lb impact tests, and resisted 100 MEK rubs, 200 MEK rubs just sufficing to remove the films.

Generally, polymers of the invention which comprise the reaction product of bisphenol-A with amines as described above, comprise 0.5 to 4 meq amine, preferably 0.7 to 2.5 meq amine, per gram of resin solids. When novalac epoxy resins are utilized to form the polymers of the invention, in which case hydrophobic amines are often added as described above, the polymers preferably comprise 0.5 to 5 meq amine, more preferably 0.7 to 3 meq amine, per gram of resin solids. When hydrophobic amines as described above are utilized they may comprise 10 to 80%, preferably, 10 to 40% by weight of the total amines (hydrophobic amines and hydroxyalkyl carbamate-containing amines) charged to the reaction. The amines which contain the hydroxyalkyl carbamate group are preferably hydrophilic amines such as diethylenetriamine bishydroxyethyl carbamate, and the carbamate of Examples 1 and 3. The bisphenol-A-derived polymers are hydrophobic enough to overcome the influence of the hydroxyalkyl carbamate groups, provided that the equivalent weight of epoxy is sufficiently high. Low molecular weight bisphenol-A epoxy resins can be chain-extended with primary or di-secondary amines, taking care to select reactants and conditions so as to avoid gellation.

The following Example 12 shows the preparation of a hydroxyalkyl carbamate-containing amine used in the composition of Example 13 below.

EXAMPLE 12

Diethylenetriamine in the amount of 618 grams (6 moles) was added to a suitable reactor. 1836 grams (18 moles) of propylene carbonate, which amount comprises 6 moles in excess of the stoichiometric amount, was slowly added to the reactor under a nitrogen blanket while the temperature of the reactants was maintained at 15° to 20° C. by ice bath cooling. After complete addition, the mixture was stirred 8 hours at room temperature. The resulting product solution comprised diethylenetriamine bishydroxypropyl carbamate and was 75.2% solids in propylene carbonate (theory 75% solids), had 2.51 meq/g secondary amine (theory 2.45 meq/g at 75.2% solids), and gave characteristic bands in the infrared for the hydroxypropyl carbamate group.

EXAMPLE 13

Novalac Based Hydroxyalkyl Carbamate Electrocoating Resin

A. A self-cross-linking cathodic electrocoating composition based upon a novalac-hydroxyalkyl carbamate resin was prepared from the following ingredients:

| | Parts by Weight | Equivalents | Solids |
|---|---|---|---|
| DEN$^R$ 485* | 528.9 | 3.00 | 528.9 |
| Methyl isobutyl ketone (MIBK) | 100.0 | — | — |
| N—methylaniline | 175.4 | 1.64 | 175.4 |
| Carbamate-containing Amine of Example 12 | 484.8 | 1.23 | 364.6 |
| Butyl Cellosolve** | 143.2 | — | — |
| Styrene Oxide | 21.4 | 0.18 | 21.4 |

*Dow Chemical Co. Epoxy Novalac Resin
**Monobutyl ether of ethylene glycol

B. The DEN 485 and MIBK were charged under nitrogen into a suitable reactor having a decanting trap in the distillate return line. The mixture was heated to reflux with stirring in order to remove any water present. After cooling to 100° C., the N-methylaniline was charged in 40 parts of the butyl Cellosolve and the stirred mixture was heated and held at 140° to 145° C. for 2 hours. After this period the mixture was cooled to 90° C. and the carbamate-containing amine of Example 12 and the remainder of the butyl Cellosolve was added. This mixture was stirred and heated at 90° C. for 2.5 hours and then the styrene oxide was added and the temperature held at 90° to 100° C. for 2 hours further. The analysis for the final electrocoating resin showed 1.81 meq/g amine. The resin was 75% solids.

C. An electrocoating bath was prepared by combining 300 parts of the novalac-hydroxypropyl carbamate electrocoating resin of part B of this Example with 6.83 parts of 90.8% formic acid and 4.62 parts of dibutyltindilaurate (a urethane catalyst). 2046.7 parts of deionized water was slowly added while rapidly mixing with a Cowels stirrer to produce a bath containing approximately 10% solids. The electrocoating bath had a pH of 4.4, a conductivity of 600 micromho cm$^{-1}$, and a rupture voltage of 210 volts.

EXAMPLE 14

The electrodeposition bath of Example 13 was applied to a substrate comprising a 2024T3 Phosanodized bare aluminum member at a deposition voltage of 75 V applied for 20 seconds. The resulting deposited coating was cured by heating for 5 minutes to 347° F. (175° C.) then maintaining 175° C. for an additional 20 minutes. Film builds of 0.35 to 0.4 mils were attained. The resultant coatings were glossy, showed a slight orange peel texture, exhibited 7H pencil hardness, passed 40+ in-lb impact tests on 0.02 inch thick substrate and were not removed after 300+ rubs with methyl ethyl ketone.

Generally, utilization of a suitable ternary or quaternary ammonium catalyst provides an electrodeposited coating which can be cured at low temperature, e.g., 250° F. (121° C.). Temperatures as low as 200° F. (93° C.) can successfully be utilized when an appropriate amount of such catalyst is employed. The amount of such catalyst employed to effectuate a low temperature cure is generally about 0.1 to 10%, preferably 1 to 5%, by weight of the weight of resin solids.

Generally, reference herein and in the claims to hydroxyalkyl carbamates and compounds containing the same, including structural formulas of the same, is intended to include the various isomeric species thereof, if any.

While the invention has been described with respect to specific preferred embodiments, it will be apparent to one skilled in the art that numerous variations may be made to the embodiments without departing from the spirit and scope of the invention.

What is claimed is:

1. A cathodically electrodepositable, self-cross-linkable polymer containing hydroxyalkyl carbamate groups and one or more tertiary amine groups per molecule.

2. The polymer of claim 1 obtained as the reaction product of (a) an epoxy resin having an average epoxy equivalent weight of from about 300 to about 10,000, and (b) one or more amines having at least one secondary amine group and at least one hydroxyalkyl carbamate group or precursor thereof.

3. The polymer of claim 2 wherein said hydroxyalkyl carbamate groups are obtained by reaction of an amine with a cyclic carbonate.

4. The polymer of claim 2 wherein said epoxy resin is selected from the group consisting of: (i) the reaction product of epichlorohydrin and a polyhydric phenol, (ii) the epoxy resin of (i) modified by reaction with carboxylate containing polybutadiene polymers, and (iii) the reaction product of epichlorohydrin and a condensation product of phenol with acetone and formaldehyde.

5. The polymer of claim 1 containing from about 0.6 to about 3.5 meq hydroxyalkyl carbamate per gram of resin solids.

6. The polymer of claim 1 containing from about 0.6 to about 2.9 meq hydroxyalkyl carbamate per gram of resin solids.

7. The polymer of claim 1 containing from about 1.1 to about 2.5 meq hydroxyalkyl carbamate per gram of resin solids.

8. The polymer of claim 1 containing from about 0.5 to about 5 meq amine per gram of resin solids.

9. The polymer of claim 1 containing from about 0.7 to about 5 meq amine per gram of resin solids.

10. The polymer of claim 2 wherein said epoxy resin has an epoxy equivalent weight of from about 1,000 to about 4,000.

11. The polymer of claim 1 further having one or more hydrophobic amine groups pendant thereon.

12. A cathodically electrodepositable self-cross-linkable polymer comprising a hydroxyalkyl carbamate-containing resin having more than one tertiary amine group and two or more hydroxyalkyl carbamate groups per molecule, said polymer further containing from about 0.6 to about 3.5 meq hydroxyalkyl carbamate per gram and from about 0.5 to about 5 meq amine per gram and being obtained by reaction of epoxy groups of one or more epoxides with a secondary amine group of one or more amines containing carbamate groups or precursors thereof, said epoxide having an average epoxy equivalent weight of from about 300 to about 10,000.

13. The polymer of claim 12 wherein said epoxide is selected from the group consisting of (i) the reaction product of epichlorohydrin and polyhydric phenol, (ii) the epoxy polymer of (i) modified by reaction with carboxylate containing polybutadiene polymers, and (iii) the reaction product of epichlorohydrin and the condensation product of phenol and acetone and formaldehyde.

14. The polymer of claim 12 wherein said one or more amines are selected from the group consisting of:

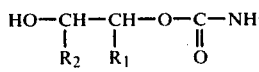

wherein A is $[NH(CH_2)_x]_nNH$; n is 0 to 10; each x is independently 2 to 6; each of $R_1$ and $R_2$ is independently H, or a $C_1$ to $C_{20}$ alkyl, cycloalkyl or alkyl aromatic moiety or any of the foregoing containing one or more heteroatoms in addition to at least one carbon atom;

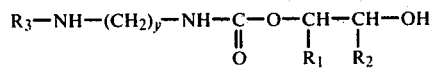

wherein: y is 2 or 3; each of $R_1$ and $R_2$ is as defined above; and $R_3$ is a $C_1$ to $C_{20}$ alkyl, cycloalkyl or alkyl aromatic moiety;

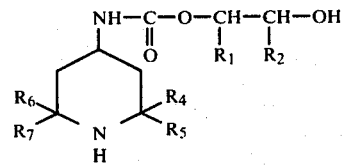

wherein: each of $R_4$ and $R_6$ is independently H or $C_1$ to $C_4$ alkyl moieties and each of $R_5$ and $R_7$ is independently a $C_1$ to $C_4$ alkyl moiety or such moiety containing one or more heteroatoms in addition to at least one carbon atom; and

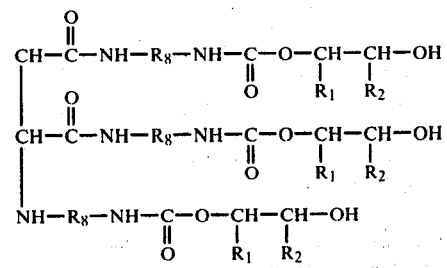

wherein each of $R_1$ and $R_2$ is as defined above and each $R_8$ is independently a $C_2$ to $C_6$ alkylene moiety;

and said polymer contains from about 0.6 to about 2.9 meq hydroxyalkyl carbamate and from about 0.5 to about 5 meq amine per gram of resin solids.

15. The polymer of claim 12 wherein said epoxide is a polyepoxide selected from the group consisting of polyepoxides of the formulas:

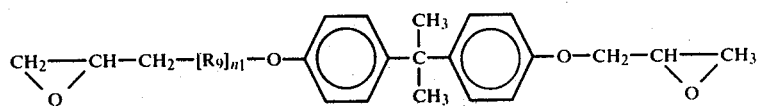

where $R_9$ is the repeating fragment

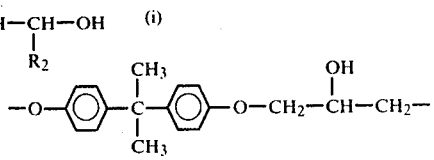

and $n_1$ is from 0 to 12;

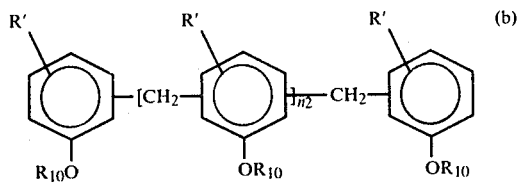

where R' is a hydrogen or a methyl group and $R_{10}$ is a hydrogen atom or a glycidyl group and $n_2$ is from 0 to 12; and (c) an aromatic novalac bisphenol-A resin.

16. The polymer of claim 12 further including one or more hydrophobic amine groups joined to said cathodically depositable polymer to enhance hydrophobicity thereof.

17. A method of preparing a cathodically electrodepositable, self-cross-linkable polymer comprising reacting (a) an epoxide having an average epoxy equivalent weight of from about 300 to about 10,000, with (b) an amine containing at least one secondary amine group and at least one group selected from the class consisting of hydrolyzable blocked primary amine groups and hydroxyalkyl carbamate groups, to form a substantially epoxy-free material and, when said blocked primary amine groups are present, hydrolyzing the same to unblock said primary amine groups and then reacting a cyclic carbonate with said primary amine groups to form said hydroxyalkyl carbamate groups; the reactants (a) and (b) being selected to form said polymer with from about 0.6 to about 3.5 meq hydroxyalkyl carbamate per gram of resin solids.

18. The method of claim 17 wherein said epoxide has an average epoxy equivalent weight of from about 4,000 to about 10,000 and said polymer has from about 0.6 to about 2.9 meq hydroxyalkyl carbamate per gram of resin solids.

19. The method of claim 17 further including reacting one or more hydrophobic amines with said epoxy resin to enhance hydrophobicity of said polymer.

20. An electrodeposition bath comprising an aqueous dispersion of an acidified, cathodically electrodepositable, self-cross-linkable polymer containing at least two hydroxyalkyl carbamate groups and at least one tertiary amine group per molecule, and obtained as the reaction product of (a) an epoxy resin having an average molecular weight of from about 300 to about 10,000, and (b) one or more amines having at least one secondary amine group and at least one hydroxyalkyl carbamate group or precursor thereof.

21. The electrodeposition bath of claim 20 further including a cross-linking catalyst.

22. The electrodeposition bath of claim 21 wherein said catalyst is a suitable quaternary compound.

23. The electrodeposition bath of claim 20 wherein said epoxy resin is selected from the group consisting of: (i) the reaction product of epichlorohydrin and a polyhydric phenol, (ii) the epoxide of (i) modified by reaction with carboxylate containing polybutadiene polymers, and (iii) the reaction product of epichlorohydrin and a condensation product of phenol with acetone and formaldehyde.

24. The electrodeposition bath of claim 21 wherein said catalyst is selected from the class consisting of quaternary and ternary compounds.

25. A method of preparing a cross-linked coating utilizing the electrodeposition bath of claim 24 comprising immersing a substrate in the bath, cathodically electrodepositing a coating of the polymer from the bath onto the substrate, removing the coated substrate from the bath, and heating the coated substrate at a temperature and for a time sufficient to cure the deposited coating.

26. The method of claim 25 wherein the catalyst is selected from the class consisting of one or more quaternary ammonium, phosphonium and arsonium compounds and ternary sulfonium compounds.

27. The method of claim 25 wherein the catalyst is a quaternary ammonium compound.

28. The method of claim 25 wherein the coated substrate is heated to a temperature of from about 200° to about 250° F. (about 93° to about 121° C.) to cure the deposited coating.

29. The electrodeposition bath of claim 21 wherein said cross-linking catalyst is a metal catalyst.

30. The electrodeposition bath of claim 29 wherein said metal catalyst is selected from the group consisting of tin, zinc and titanium compounds.

31. The electrodeposition bath of claim 30 wherein said metal catalyst is dibutyltindilaurate.

32. The polymer of claim 2 wherein said epoxy resin is the reaction product of bisphenol-A and epichlorohydrin.

33. The polymer of claim 12 wherein said epoxide is the reaction product of bisphenol-A and epichlorohydrin.

34. The electrodeposition bath of claim 20 wherein said epoxy resin is the reaction product of bisphenol-A and epichlorohydrin.

35. The polymer of claim 14 wherein $R_3$ contains one or more heteroatoms.

* * * * *